Aug. 23, 1932.  L. J. HEDSTROM  1,873,200
POWER TRANSMISSION
Filed Jan. 20, 1932  3 Sheets-Sheet 1
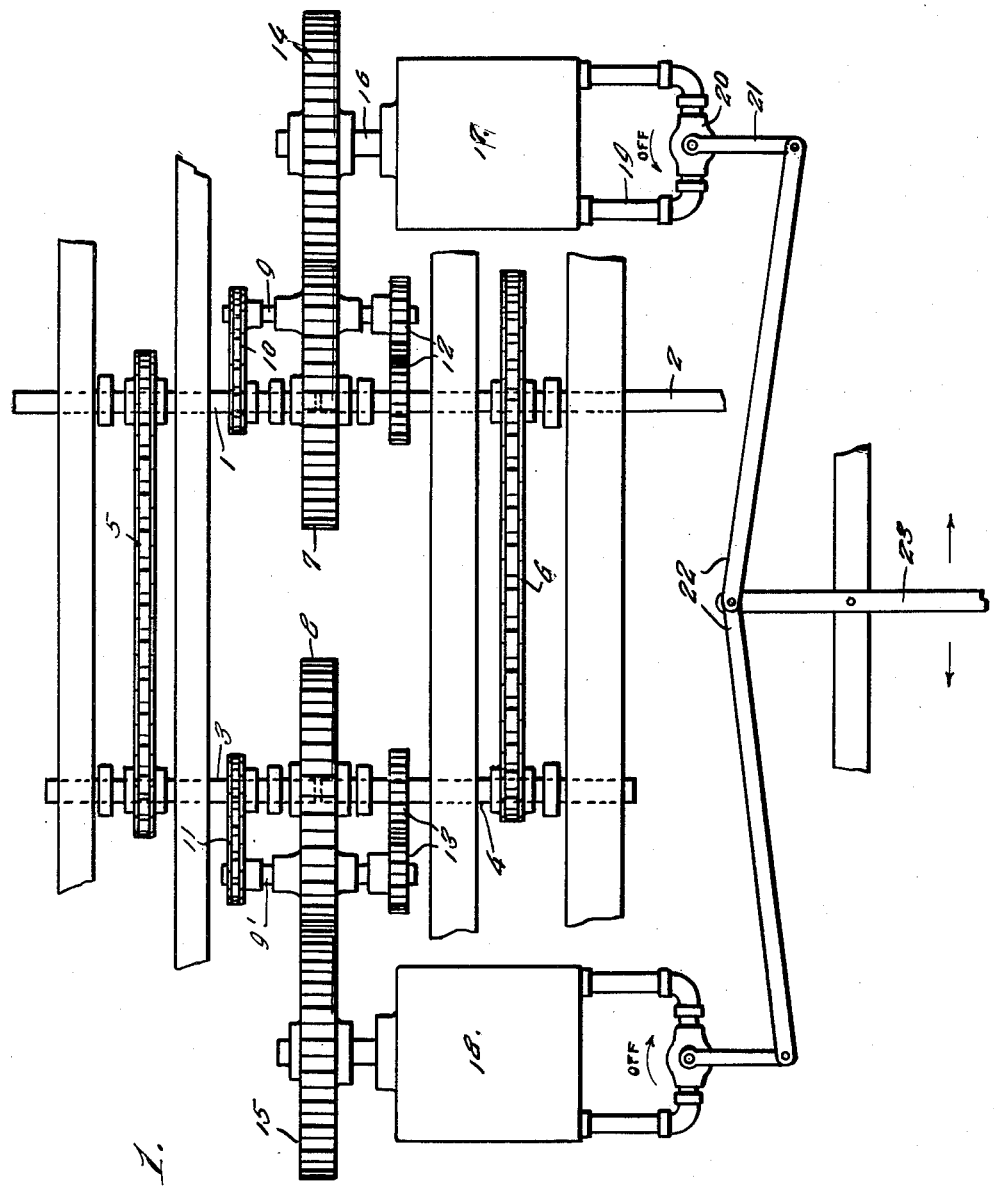
Inventor
Ludvig J. Hedstrom
By Clarence A. O'Brien
Attorney Aug. 23, 1932.  L. J. HEDSTROM  1,873,200
POWER TRANSMISSION
Filed Jan. 20, 1932  3 Sheets-Sheet 2
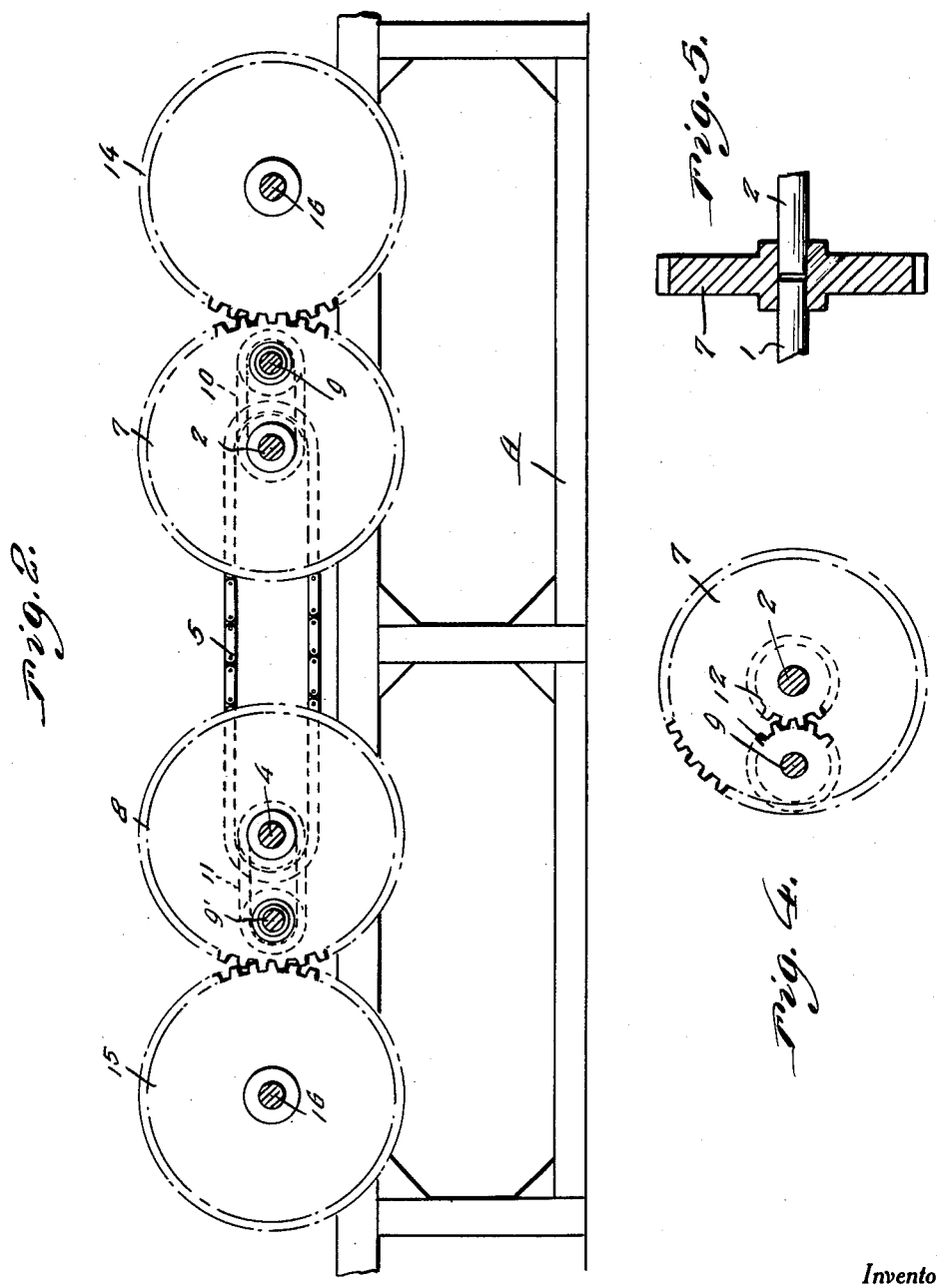
Inventor
Ludvig J. Hedstrom
By Clarence A. O'Brien
Attorney Aug. 23, 1932.    L. J. HEDSTROM    1,873,200
POWER TRANSMISSION
Filed Jan. 20, 1932    3 Sheets-Sheet 3
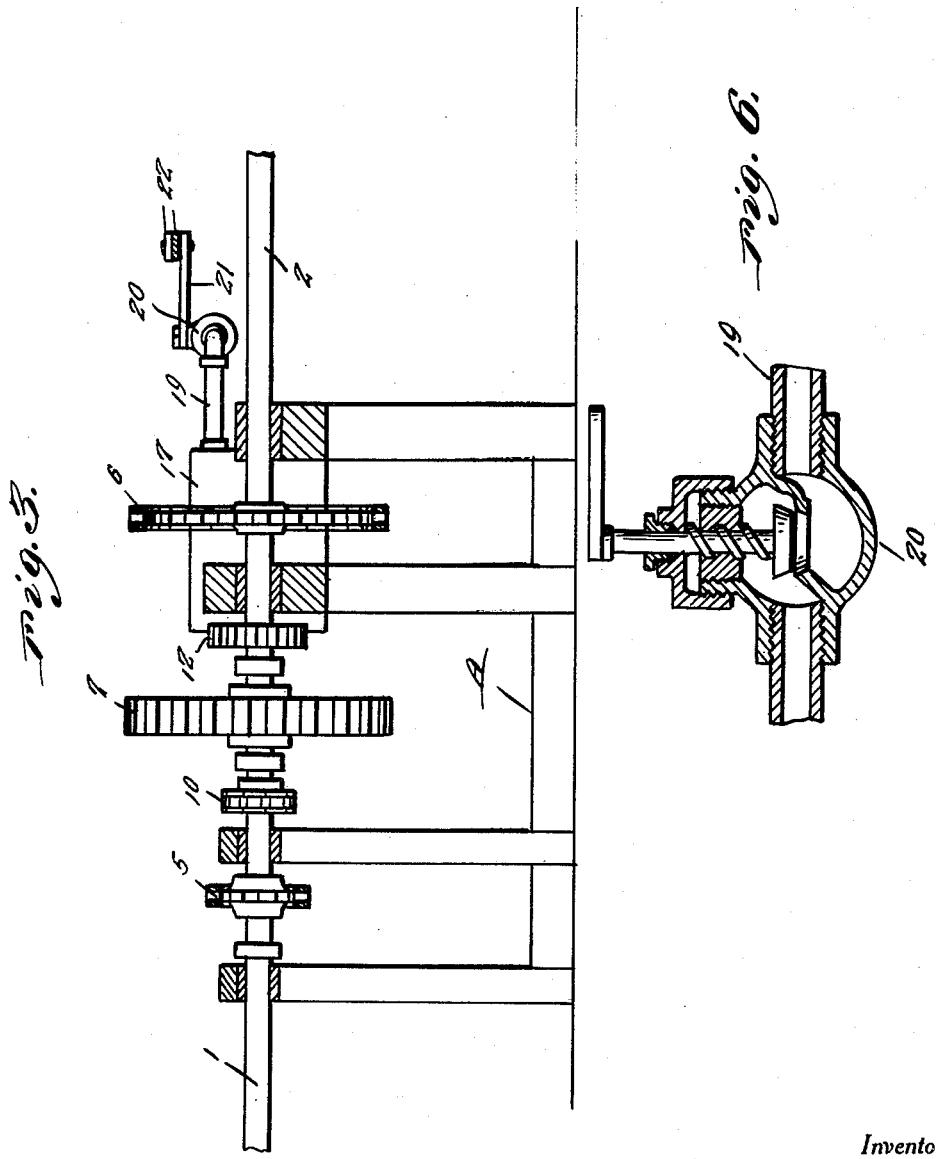
Inventor
Ludwig J. Hedstrom
By Clarence A. O'Brien
Attorney Patented Aug. 23, 1932

1,873,200

UNITED STATES PATENT OFFICE

LUDVIG J. HEDSTROM, OF KANSAS CITY, KANSAS

POWER TRANSMISSION

Application filed January 20, 1932. Serial No. 587,794.

This invention relates to transmission means, the general object of the invention being to provide a variable speed transmission means which is regulated by a pair of pumps each having its inlet connected with its outlet, with valve means for controlling the flow of fluid from the outlet to the inlet.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings, wherein like characters denote like or corresponding parts throughout the several views, and in which:—

Figure 1 is a diagrammatic plan view of the invention.

Fig. 2 is a longitudinal sectional view through Fig. 1.

Fig. 3 is a transverse sectional view through Fig. 1.

Fig. 4 is a view partly in section and showing how an idle gear carries its shaft.

Fig. 5 is a sectional view showing how the idle gear is rotatably arranged on a pair of alined shafts.

Fig. 6 is a sectional view of one of the valves.

In these drawings, the letter A indicates a supporting frame in which is journalled the alined shafts 1 and 2 and the alined shafts 3 and 4. The shaft 1 may be the power shaft and the shaft 2 the driven shaft or the shaft to which the mechanism to be driven is connected. The shafts 1 and 3 are connected together by the chain and sprockets shown generally at 5 and the shafts 2 and 4 are connected together by the chain and sprockets shown generally at 6, the sprocket on the shaft 2 being larger than that on the shaft 4.

An idle gear 7 is located between the shafts 1 and 2 and is rotatably supported on the adjacent ends of the shafts as shown in Fig. 5, and an idle gear 8 is similarly supported on the ends of the shafts 3 and 4. Each idle gear carries a stub shaft 9, 9' concentrically arranged therein and the shaft 9 is connected by the sprockets and chain, shown generally at 10, with the shaft 1, while the other shaft 9' is connected by the chain and sprockets, shown generally at 11 with the shaft 3.

The first stub shaft 9 is connected to the shaft 2 by the the gears 12 and the other stub shaft 9' is connected to the shaft 4 by the gears 13.

The gear 14 meshes with the gear 7 and the gear 15 meshes with the gear 8 and these gears 14 and 15 are connected to shafts 16, one of which is operated by by a fluid pump 17 and the other by a fluid pump 18. The inlet and outlet of each pump are connected together as shown at 19 and a valve 20 is arranged in each of these connections to control the passage of fluid from the inlet of the pump to the outlet. The arms 21 of the valves are connected by the links 22 with a lever 23, with the parts being so arranged that when the lever is moved in one direction from its central neutral position one valve will be closed partly or closed entirely, and the other will remain open and when the lever is moved in the opposite direction from the neutral position the valves will be operated in the opposite manner. In other words when the lever 23 is in neutral position, both valves are open and when the lever is moved one valve will be closed and the other valve will remain open.

From the foregoing it will be seen that when the shaft 1 is operated through any suitable means, it will also operate the shaft 3 by the chain and sprocket connection shown at 5 and the rotation of each shaft 1 and 3 will be communicated to the shafts 9 and 9'.

If the lever 23 is in a neutral position with both valves open so that the rotary movement of the gears 14 and 15 are not checked, by the fluid in the pumps, the meshing of the gears 12 and 13 will simply cause the gears 7 and 8 to rotate as the gears on the shafts 9 and 9' travel around the gears on the shafts 2 and 4 and thus no movement is imparted to the shafts 2 and 4.

When the lever 23 is moved from neutral to low speed position, the valve of pump 18 is closed so that the gear 15 is stationary and thus locks the gear 8 against movement. Of course the valve of pump 17 is open, so that the gears 7 and 14 are free to rotate. Of course in this position, the shaft 1 rotates the shaft 3 through the sprockets and chain 5, and as the gear 8 is held against movement, movement of this shaft 3 is communicated to the shaft 4, through the sprockets and chain 11, the shaft 9' through the gears 13 and the drive shaft 2 is rotated from shaft 4 through the chain and sprockets 6. As gear 7 is free to rotate the gear 12 on shaft 9 simply travels around the gear 12 on shaft 2, and thus the movement of shaft 1 will have no direct effect on shaft 2.

When the lever 23 is in high speed position, the valve of pump 17 is closed so that the gear 14 locks the gear 7 against movement and the valve of pump 18 is opened, so that the gear 8 is free to rotate. With the parts in this position, the shaft 1 drives the shaft 9 which is stationary with respect to its travel with the gear 7, through the sprockets and chain 10 and the rotary movement of the shaft 9 is communicated to the shaft 2 through the gears 12.

Shaft 1 is also rotating shaft 3 through the chain and sprockets 5, and shaft 2 is also rotating shaft 4 through the chain and sprockets 6, but as the gear 8 is free to rotate the shafts 3 and 4, will have no effect on each other.

It is thought from the foregoing description that the advantages and novel features of the invention will be readily apparent.

It is to be understood that changes may be made in the construction and in the combination and arrangement of the several parts provided that such changes fall within the scope of the appended claims.

Having thus described my invention, what I claim as new is:—

1. A transmission device comprising a drive shaft, a driven shaft in alinement therewith, a second pair of alined shafts, an idle gear rotatably supported by the adjacent ends of the shafts of each pair, a stub shaft carried by each idle gear, gears connecting one of the stub shafts and driven shaft, gears connecting the other stub shaft with a shaft of the second pair of shafts, means for driving one of the stub shafts from the power shaft, means driving the other stub shaft from one of the second mentioned shafts, means for driving the last-mentioned shaft from the power shaft, means for driving the driven shaft from the second one of the second pair of shafts, a gear meshing with each idle gear, a pump associated with each of said gears, each pump having its inlet connected with its outlet, a valve in each connection, a lever for closing and opening the valves, said lever opening one valve and closing the other and vice versa.

2. A transmission device comprising a power shaft and a driven shaft supported in alinement with each other, an idle gear rotatably supported between the adjacent ends of the shafts, a stub shaft concentrically supported by the idle gear, means for rotating the stub shaft from the power shaft, gears connecting the stub shaft with the driven shaft, a second pair of alined shafts, means for driving one of said last-mentioned shafts from the power shaft, drive means for connecting the other one of said second pair of shafts to the driven shaft, a second idle gear rotatably supported between the adjacent ends of the second pair of shafts, a stub shaft rotatably supported by the last-mentioned idle gear, means for driving said stub shaft from that shaft of the second pair which is driven from the power shaft, gears connecting said stub shaft to the second one of the second pair of shafts, a pair of pumps, gears rotated by the pumps and meshing with the idle gears, each pump having its inlet connected with its outlet, a valve in each connection, and manually operated means for moving one valve to closed position and the other to open position, and vice versa, both of said valves being open when the lever is in neutral position.

In testimony whereof I affix my signature.

LUDVIG J. HEDSTROM.